(12) United States Patent
Matsusaka et al.

(10) Patent No.: US 9,163,553 B2
(45) Date of Patent: Oct. 20, 2015

(54) VEHICULAR COOLANT CONTROL VALVE

(71) Applicant: AISIN SEIKI KABUSHIKI KAISHA, Kariya-shi (JP)

(72) Inventors: Masanobu Matsusaka, Kariya (JP); Tadayoshi Sato, Kariya (JP); Naoto Yumisashi, Kariya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/238,101

(22) PCT Filed: Oct. 24, 2012

(86) PCT No.: PCT/JP2012/077488
§ 371 (c)(1),
(2) Date: Feb. 10, 2014

(87) PCT Pub. No.: WO2013/065549
PCT Pub. Date: May 10, 2013

(65) Prior Publication Data
US 2014/0224891 A1 Aug. 14, 2014

(30) Foreign Application Priority Data

Nov. 4, 2011 (JP) .................................. 2011-242691
Dec. 19, 2011 (JP) .................................. 2011-277333

(51) Int. Cl.
*F01P 7/14* (2006.01)
*F16K 1/44* (2006.01)
(Continued)

(52) U.S. Cl.
CPC ... *F01P 7/14* (2013.01); *F16K 1/44* (2013.01); *F16K 1/52* (2013.01); *F16K 31/0658* (2013.01);
(Continued)

(58) Field of Classification Search
CPC ......... F16K 1/44; F16K 1/52; F16K 31/0655; F16K 31/0658; F01P 2007/146; F01P 2025/04; F01P 2060/08

USPC ....................... 236/34.5; 251/129.15, 129.22; 123/41.08, 41.09
See application file for complete search history.

(56) References Cited

U.S. PATENT DOCUMENTS

2004/0163612 A1 8/2004 Takahashi
2007/0069165 A1 3/2007 Hess et al.
(Continued)

FOREIGN PATENT DOCUMENTS

DE            10354230 A1    6/2005
DE      102008056247 A1    5/2010
(Continued)

OTHER PUBLICATIONS

Extended European Search Report dated Aug. 7, 2014, issued by the European Patent Office in corresponding European Patent Application No. 12845279.4 (8 pgs).
(Continued)

*Primary Examiner* — Marc Norman
(74) *Attorney, Agent, or Firm* — Buchanan Ingersoll & Rooney PC (57) ABSTRACT

A vehicular coolant control valve configured so that the opened state thereof can be switched between a state allowing a normal amount of fluid to pass and a state allowing a lesser amount of fluid to pass. The control valve includes a valve body having a magnetic body and controlling fluid flow, a valve seat constituting a fluid flow channel and coming into contact with the valve body to close the flow channel, a solenoid magnetically maintaining a contact state between the valve body and valve seat, and an urging mechanism urging the valve body opposite to a flow direction of the fluid. The valve body includes a first valve body maintaining a contact state with the valve seat when the solenoid is excited and a second valve body allowing passage of a small amount of the fluid when the first valve body is in contact with the valve seat.

6 Claims, 7 Drawing Sheets

(51) Int. Cl.
    *F16K 1/52*     (2006.01)
    *F16K 31/06*    (2006.01)

(52) U.S. Cl.
    CPC ....... *F16K 31/0682* (2013.01); *F01P 2007/146* (2013.01); *F01P 2025/04* (2013.01); *F01P 2060/08* (2013.01)

(56) References Cited

U.S. PATENT DOCUMENTS

| | | | |
|---|---|---|---|
| 2008/0017353 | A1 | 1/2008 | Folea |
| 2009/0256094 | A1* | 10/2009 | Sasago ............... 251/129.15 |
| 2010/0206250 | A1 | 8/2010 | Baumann et al. |
| 2011/0204151 | A1 | 8/2011 | Heldberg |
| 2013/0020513 | A1 | 1/2013 | Matsusaka et al. |
| 2013/0161547 | A1* | 6/2013 | Matsusaka et al. ...... 251/129.15 |
| 2013/0220243 | A1* | 8/2013 | Matsusaka et al. ........ 123/41.01 |
| 2014/0137817 | A1* | 5/2014 | Komuro et al. ............ 123/41.08 |

FOREIGN PATENT DOCUMENTS

| | | |
|---|---|---|
| EP | 1881171 A1 | 1/2008 |
| EP | 2218887 A2 | 8/2010 |
| FR | 2483578 A1 | 12/1981 |
| JP | 7-332085 A | 12/1995 |
| JP | 2002-340219 A | 11/2002 |
| JP | 2003-328753 A | 11/2003 |
| JP | 2006-528311 A | 12/2006 |
| JP | 2009-085130 A | 4/2009 |
| JP | 2011-111962 A | 6/2011 |
| WO | WO 2011/132530 A2 | 10/2011 |

OTHER PUBLICATIONS

International Search Report (PCT/ISA/210) mailed on Jan. 29, 2013, by the Japanese Patent Office as the International Searching Authority for International Application No. PCT/JP2012/077488.

Written Opinion (PCT/ISA/237) mailed on Jan. 29, 2013, by the Japanese Patent Office as the International Searching Authority for International Application No. PCT/JP2012/077488.

* cited by examiner

VEHICULAR COOLANT CONTROL VALVE

TECHNICAL FIELD

The present invention relates to a vehicular coolant control valve for use in a cooling system of e.g. an engine.

BACKGROUND ART

For the purpose of e.g. improvement of fuel consumption efficiency, a vehicular engine is subject to a control for effecting a warm-up operation when the temperature of the engine is low and maintaining the temperature constant after the engine temperature has risen. To this end, as a cooling system for an engine, there is generally known a system configured as follows. With opening/closing of a thermostat valve, when the temperature of cooling water is low, this valve is closed to cause the cooling water to circulate via a bypass flow channel, bypassing a radiator; whereas, when the cooling water temperature has risen, the valve is opened to cause the cooling water to flow through the radiator, thus maintaining the cooling water temperature constant. Further, under a low temperature condition of the cooling water, via a warm-up operation, the engine temperature is raised speedily to the optimal temperature. Thereafter, the engine temperature is maintained approximately constant to stabilize combustion for improvement of fuel efficiency.

Patent Document 1 discloses a thermostat wherein a channel to a radiator exit channel is provided in a thermo element temperature-sensitive chamber provided independently on the exit side of an engine, for enabling operations with taking the radiator exit side liquid temperature into consideration. Within the thermo element of this thermostat, a thermo wax capable of heat expansion is charged, so that the valve body is opened/closed according to the cooling water temperature. Further, the thermo element is combined with a heat generating element such as a nichrome heater to open/close the valve body for electronically controlling the cooling water temperature.

Patent Document 2 discloses a solenoid valve having a movable portion urged to a closing direction by a spring. This solenoid valve is configured to be closed at the time of non-excited state of the coil and opened at the time of the excited state of the coil; thus, switchover between the opened state and the closed state can be effected in a speedy manner. With this, in case the solenoid valve is provided on the engine exit side in the above-described engine cooling system, the switchover between the valve closed state for causing cooling water to circulate via the bypass channel bypassing the radiator and the valve opened state for causing the cooling water to flow through the radiator when the cooling water temperature becomes high, can be effected speedily, thus achieving good valve responsiveness.

CITATION LIST

Patent Literature

Patent Document 1: Japanese Unexamined Patent Application No. 2003-328753
Patent Document 2: Japanese Unexamined Patent Application No. 2002-340219

SUMMARY OF INVENTION

Figure 11:
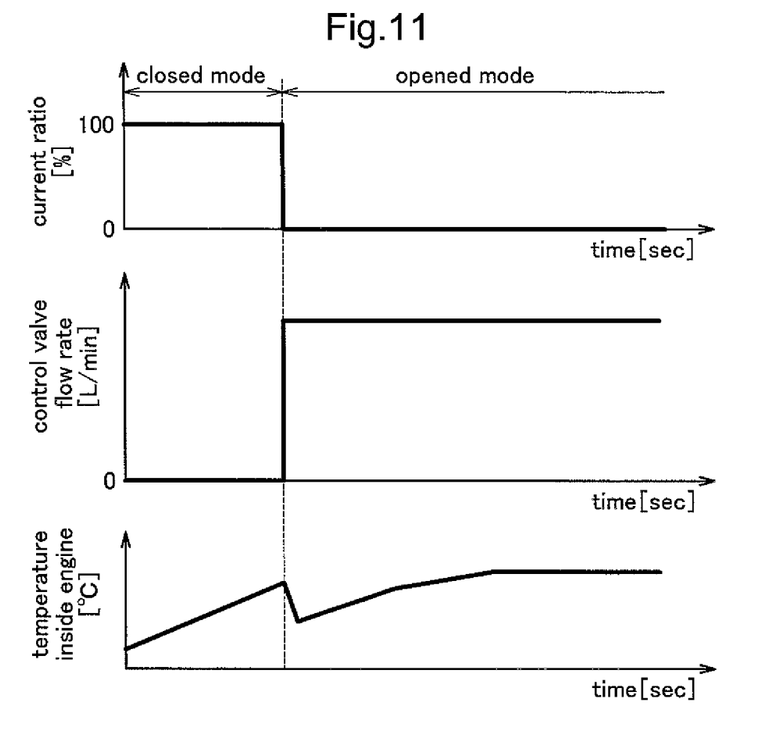
[FIG. 11] is a view showing relationship among an inside temperature of engine, a flow rate of the control valve, a current ratio and opened and closed states of a conventional control valve.

In a cooling system of an engine, in case the solenoid valve disclosed in Patent Document 2 is installed at the cooling water exit from the engine, the flow of cooling water of the entire cooling system is stopped when this solenoid valve is rendered into the closed state. Under this condition, the heat inside the engine is not discharged to the outside, so that the warm-up operation is promoted. However, when the solenoid valve is opened upon detection of the temperature inside the engine having reached a predetermined temperature, the solenoid valve is switched to the opened state immediately. Hence, an amount of cooling water not heated outside the engine will flow all at once to the inside of the engine, thereby to promote cooling of the engine. In this case, as shown in FIG. 11, the temperature inside the engine drops sharply, thus rendering combustion in the engine unstable.

The present invention has been made in view of the above-described problem. Its object is to provide a vehicular coolant control valve configured so that the opened state thereof can be switched over between a state allowing a normal amount of fluid to pass therethrough and a state allowing a smaller amount of fluid than the normal amount to pass therethrough.

According to a first characterizing feature of a vehicular coolant control valve relating to the present invention, the control valve comprises a valve body having a magnetic body and controlling flow of fluid, a valve seat constituting a flow channel for the fluid and coming into contact with the valve body to close the flow channel, a solenoid magnetically maintaining a contact state between the valve body and the valve seat, and an urging mechanism urging the valve body in a direction opposite to a flow direction of the fluid, wherein the valve body includes a first valve body maintaining a contact state with the valve seat when the solenoid is excited and a second valve body capable of allowing passage of a small amount of the fluid when the first valve body is in contact with the valve seat.

With the above arrangement including a valve body having a magnetic body and controlling flow of the fluid, a valve seat constituting a flow channel for the fluid and coming into contact with the valve body to close the flow channel, a solenoid magnetically maintaining the contact state between the valve body and the valve seat, and an urging mechanism urging the valve body in a direction opposite to a flow direction of the fluid, when the solenoid is excited with power supply, magnetism generated in association therewith maintains the contact between the valve body and the valve seat, thus realizing the closed state of the valve body. Whereas, when the solenoid is non-excited with no power supply, the contact between the valve body and the valve seat is no longer maintained, thus realizing the opened state of the valve body through which the fluid can flow.

Further, since the valve body includes a first valve body maintaining a contact state with the valve seat when the solenoid is excited and a second valve body capable of allowing passage of a small amount of the fluid when the first valve body is in contact with the valve seat, the valve body can be switched over between a state in which the first valve body is opened to allow flow of a normal amount of fluid and a state in which the second valve body is opened to allow flow of a small amount of fluid. With this, when the coolant control valve is opened upon detection of the temperature inside the engine having reached a predetermined temperature, at the first stage, it is possible to cause a small amount of coolant to flow into the engine by opening the second valve body. As a result, it is possible to avoid sharp drop of the temperature inside the engine and to allow combustion in the engine to proceed in a stable manner.

According to a second characterizing feature of a vehicular coolant control valve relating to the present invention, the first valve body forms a communication hole for the fluid, and the second valve body can be switched over between a closed state closing the communication hole and an opened state opening the communication hole and the second valve body is maintained under the closed state with leakage flux of the solenoid from the first valve body and can be switched over to the opened state in response to decrease in power supplied to the solenoid.

With the above arrangement wherein the first valve body forms a communication hole for the fluid, and the second valve body can be switched over between a closed state closing the communication hole and an opened state opening the communication hole, when the second valve body is rendered into the opened state, the communication hole formed in the first valve body is opened. And, as the fluid flows through this communication hole, the small amount of passage of fluid is realized. Further, since the second valve body is maintained under the closed state with leakage flux of the solenoid from the first valve body and can be switched over to the opened state in response to decrease in the power supplied to the solenoid, the first valve body and the second valve body can be maintained under the closed states with the magnetic flux from the common solenoid and switchover of the second valve body into the opened state can be realized simply by decreasing the power supplied to the solenoid. In this way, as the communication hole formed in the first valve body is used as a small amount flow channel of the fluid and the solenoid is commonly used by the first valve body and the second valve body, the configuration of the coolant control valve can be simple and this coolant control valve per se can be formed compact.

According to a third characterizing feature of a vehicular coolant control valve relating to the present invention, the second valve body is switched into the opened state by a fluid pressure of the fluid passing through the communication hole, in response to decrease in the power supplied to the solenoid.

With the above-described arrangement utilizing the fluid pressure of fluid for realizing the opened state, there is no need to provide separately a member for rendering the second valve body into the opened state, so that the configuration of the coolant control valve can be simplified.

According to a fourth characterizing feature of a vehicular coolant control valve relating to the present invention, the urging mechanism is configured to urge the first valve body in its closing direction via the second valve body.

With the above-described arrangement that the urging mechanism is configured to urge the first valve body in its closing direction via the second valve body, it is possible to urge both the first valve body and the second valve body in the respective closing direction by means of a single urging mechanism. With this, the urging mechanism for the first valve body and the second valve body can be simple.

According to a fifth characterizing feature of a vehicular coolant control valve relating to the present invention, a current value of the power supplied to the solenoid is set according to an engine rotational speed.

With a mechanical water pump, its discharge pressure of cooling water (coolant) increases in direct proportion with the engine rotational speed. For this reason, if such mechanical water pump is connected to an inlet port of the vehicular coolant control valve, even when the power current supplied to the solenoid is decreased in order to open the second valve body, there is possibility of the first valve body being rendered into the opened state due to the influence from increase in the discharge pressure, in a high range of engine rotational speed. If this happens, in the vehicular coolant control valve, the small flow amount mode will not be realized.

However, with the above-described inventive arrangement, the current value of the power supplied to the solenoid is set according to an engine rotational speed. With this, it is possible to e.g. set higher the current value of the power supplied to the solenoid for opening the second valve body in accordance with a rise in the engine rotational speed. With this, even in the high range of engine rotational speed, phenomenon of the first valve body being immediately brought into the opened state is avoided, and the second valve body can be opened for realizing the small amount flow of the fluid.

According to a sixth characterizing feature of a vehicular coolant control valve relating to the present invention, the valve body is configured to be capable of being switched to an opened state for opening the first valve body from a closed state, with bypassing a small flow amount state provided by the second valve body.

At the time of vehicle travel for instance, there can arise a situation in which speedy feeding of fluid to the engine is needed, such as a case when a defroster operation is requested by a driver. In such situation, it is desired that the coolant control valve should execute the urgently needed fluid feed control with priority over execution of the small flow amount control of the fluid for restricting temperature change of the engine. Then, with the above-described arrangement that the valve body is configured to be capable of being switched to the opened state for opening the first valve body from the closed state with bypassing the small flow amount state provided by the second valve body, speedy feeding of fluid to the engine, when needed, is made possible, so that the operability of the coolant control valve is improved.

According to a seventh characterizing feature of a vehicular coolant control valve relating to the present invention, the solenoid includes at least one coil and a number-of-turns varying section for effecting control of the solenoid by varying an effective number of turns of the coil.

In general, the electromagnetic force of a solenoid is in direct proportion with a product of a current flowing in the coil and the number of turns of the coil (ampere-turn). That is, the electromagnetic force of a solenoid can be controlled by varying either the value of current flowing through the coil or the number of turns of the coil. In this regard, controlling the electromagnetic force of the solenoid via varying the current value flowing the coil requires a current sensor for the control of of the current value. On the other hand, with the above-described arrangement of the invention wherein the solenoid includes at least one coil and a number-of-turns varying section for effecting control of the solenoid by varying the effective number of turns of the coil, it is possible to vary the magnitude of the electromagnetic force to be applied to the valve body, with the number-of-turns varying section varying the effective number of turns of the coil. This eliminates a current sensor, thus simplifying the arrangement for controlling the electromagnetic force of the solenoid. As a result, the cost of the coolant control valve can be further reduced.

According to an eighth characterizing feature of a vehicular coolant control valve relating to the present invention, the first valve body and the second valve body are disposed side by side between an inlet port and an outlet port, the control valve includes a first intra-valve channel incorporating the first valve body and a second intra-valve channel incorporating the second valve body and bypassing the solenoid; the second valve body is capable of switching a valve hole formed in the second intra-valve channel between a closed state and an opened state; the first valve body and the second valve body are maintained under a respective closed state in response to excitation of the solenoid with power supply thereto; and the second valve body can be switched into the opened state by a fluid pressure inside the second intra-valve channel in response to decrease in the power supplied to the solenoid.

With the above-described arrangement, an amount of fluid introduced via the inlet port will flow out from the outlet port via either the first intra-valve channel incorporating the first valve body or the second intra-valve channel incorporating the second valve body. With this, by rendering the second valve body into the opened state with keeping the first valve body under the closed state, a small amount of fluid can be flown. Further, when the solenoid is excited in response to power supply thereto, the first valve body and the second valve body are maintained under the respective closed state. In response to decrease in the power supplied to the solenoid, the second valve body is switched into the opened state by the fluid pressure of the second intra-valve channel. In this manner, the first valve body and the second valve body are maintained under the respective closed state by excitation of the common solenoid, and the second valve body can be switched into the opened state only by decreasing the power to be supplied to the solenoid. Moreover, as the solenoid is shared by the first valve body and the second valve body, the configuration of the coolant control valve can be simplified.

DESCRIPTION OF EMBODIMENTS

Embodiments of a vehicular coolant control valve relating to the present invention will be explained with reference to the accompanying drawings.

Figure 1:
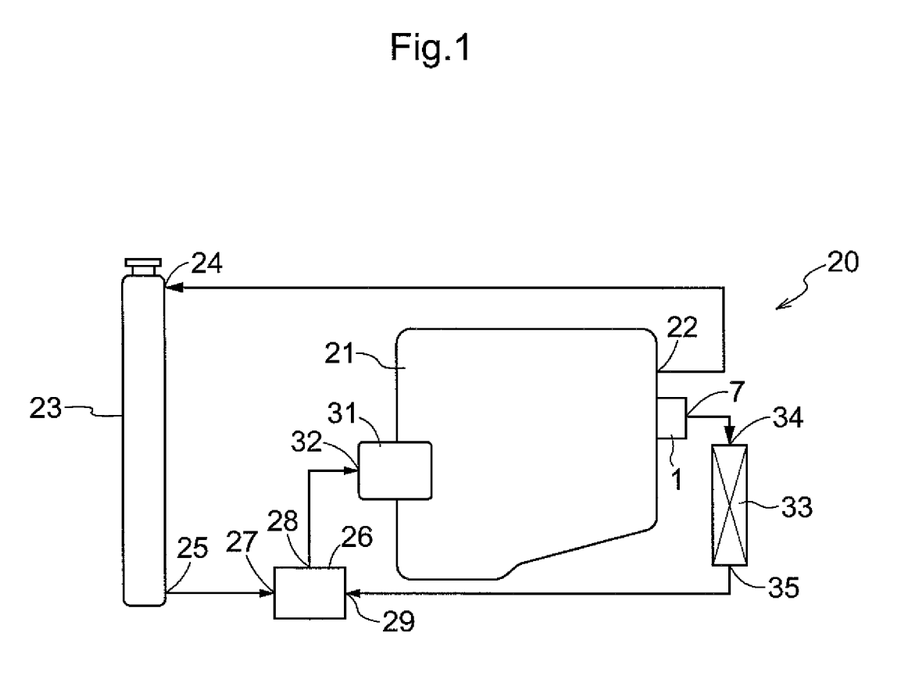
[FIG. 1] is a schematic showing a general configuration of an engine cooling system.

FIG. 1 is an explanatory view showing the general configuration of an engine cooling system 20 of a vehicle. To an outlet port 22 for cooling water (coolant) of an engine 21, an inlet port 24 of a radiator 23 is connected. An outlet port 25 of the radiator 23 is connected to an inlet port 27 of a thermostat valve 26. An outlet port 28 of the thermostat valve 26 is connected to a suction port 32 of a water pump 31. An unillustrated discharge port of the water pump 31 is connected to an unillustrated cooling-water (coolant) inlet port of the engine 21. On the other hand, an unillustrated heating outlet port of the engine 21 is connected to an inlet port 6 (see FIG. 2) of the vehicular coolant control valve 1. An outlet port 7 of the vehicular coolant control valve 1 is connected to an inlet port 34 of a heater core 33. An outlet port 35 of the heater core 33 is connected to a bypass inlet port 29 of the thermostat valve 26. The bypass inlet port 29 is communicated to an outlet port 28.

Figure 2:
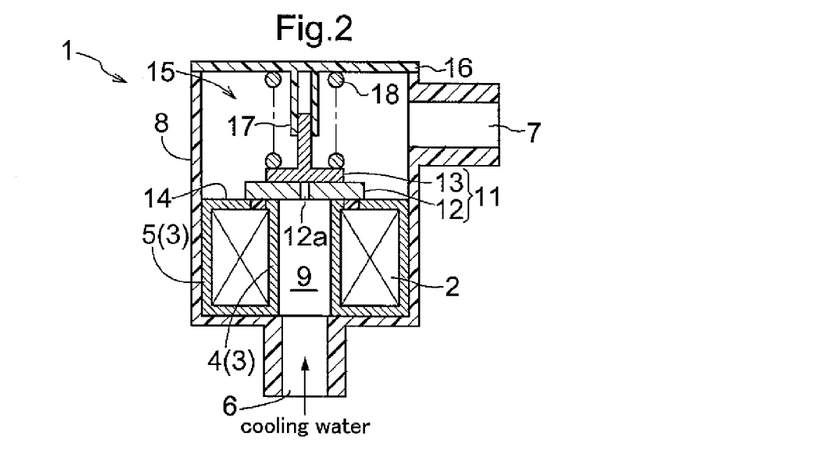
[FIG. 2] is a section view showing a condition where a first valve body and a second valve body of a vehicular coolant control valve are under closed states.

The vehicular coolant control valve ("coolant control valve" hereinafter) 1, as shown in FIG. 2, includes a housing 8, a valve seat 14, a valve body 11 movable to a position apart from the valve seat 14 and to a position in contact with this valve seat 14, and a solenoid 2 capable of maintaining the contact between the valve seat 14 and the valve body 11 with power supplied thereto.

The valve body 11 is comprised of a first valve body 12 disposed on the upstream side of the inlet port 6 and a second valve body 13 disposed on the downstream side of the inlet port 6. The first valve body 12 is provided as a valve body which is opened/closed as coming into contact with or departing from the valve seat 14. And, this first valve body 12 forms a fluid communication hole 12a. This fluid communication hole 12a acts as a flow channel for a small amount of fluid as will be described later.

The housing 8 includes the inlet port 6, the outlet port 7, an opening 15 formed in concentric opposition to the inlet port 6, and a cover member 16 for sealing the opening 15. The outlet port 7 is provided along a direction normal to the inlet port 6.

The solenoid 2 is comprised of a length of copper wire electrically connected to a drive circuit via an unillustrated connector and wound around an inner diameter portion 4 of a bobbin 3 formed of a magnetic material such as iron and held between this inner diameter portion 4 and an outer diameter portion 5 of the bobbin 3. The bobbin 3 is installed within the housing having the inlet port 6 and the outlet port 7. On the inner side of the inner diameter portion 4 of the bobbin 3, there is formed an intra-valve channel 9, and this intra-valve channel 9 is communicated to the inlet port 6.

The first valve body 12 and the second valve body 13 are formed of magnetic material such as iron and the second valve body 13 is supported via a bearing 17 to a slidable cover member 16. Also, the first valve body 12 too is slidably supported to the cover member 16 via an unillustrated guiding portion. The cover member 16 is sealingly installed at the opening 15 of the housing 8 formed on the side opposite to the inlet port 6. The valve seat 14 coming into contact with the first valve body 12 is formed in the flange face of the bobbin 3 on the side opposite to the inlet port 6. Between the second valve body 13 and the cover member 16, there is disposed a coil spring 18 provided as an urging mechanism. This coil spring 18 urges the second valve body 13 toward the valve seat 14 and urges the first valve body 12 too toward the valve seat 14 via the second valve body 13.

The first valve body 12 is attracted and attached to the valve seat 14 in response to excitation of the solenoid 2 upon power supply thereto, thereby to maintain the contact state between the first valve body 12 and the valve seat 14. This state is the closed state of the first valve body 12. In response to the excitation of the solenoid 2 upon power supply thereto, the second valve body 13 is maintained under a closed state closing the fluid communication hole 12a of the first valve body 12, with leakage flux of the solenoid 2.

When the engine 21 is stopped, the water pump 31 too is stopped. Hence, no fluid pressure is generated at the inlet port 6. Accordingly, the first valve body 12 is maintained under its closed state in contact with the valve seat 14 by being urged by the urging force of the coil spring 18 (see FIG. 2). Incidentally, although the water pump 31 employed in the instant embodiment is configured as a mechanical type, the water pump connected to the inlet port 6 of the coolant control valve 1 may alternatively be an electrically powered pump.

At the time of start of the engine 21, the solenoid 2 is excited with power supply thereto, whereby a force of attraction is applied to the first valve body 12 formed of the magnetic material. As the valve body 11 of the coolant control valve 1 receives the attraction force from the solenoid 2 and the urging force from the coil spring 18, the valve body 11 is brought into contact with the valve seat 14 and then maintained under this state (closed state) in contact with the valve seat 14, even when a fluid pressure generated in association with discharging of the water pump 31 is applied to the first valve body 12. Under this condition, as the second valve body 13 is maintained under the closed state closing the communication hole 12a of the first valve body 12, the valve body 11 (first valve body 12, second valve body 13) assumes its closed state (see FIG. 2).

When the temperature inside the engine 21 rises to a predetermined temperature and a fluid supply request is provided to the coolant control valve 1, the supply power current value to the solenoid 2 is reduced to e.g. about 50%. With this, although the first valve body 12 is maintained under its state in contact with the valve seat 14, the second valve body 13 is moved toward its opening direction by the pressure of fluid passing through the communication hole 12a defined in the first valve body 12 (see FIG. 3).

Figure 3:
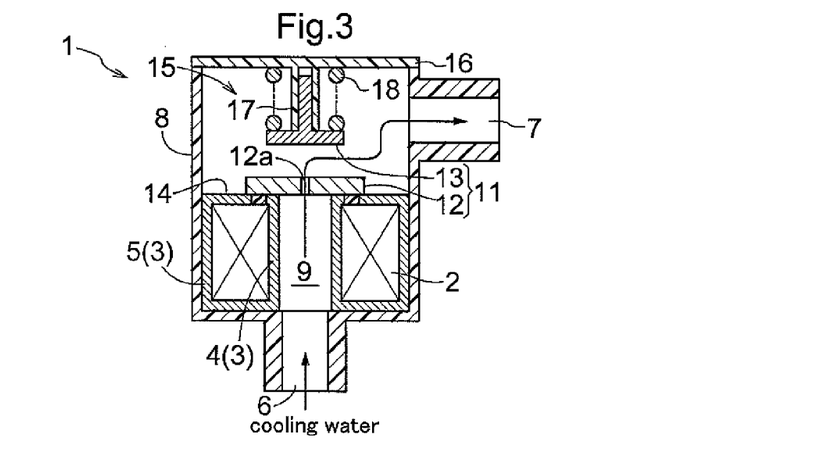
[FIG. 3] is a section view showing a condition where the second valve body of the vehicular coolant control valve is under an opened state.

When the second valve body 13 is switched into its opened state, the communication hole 12a formed in the first valve body 12 is opened, whereby an amount of fluid can pass through this communication hole 12a, thus realizing passage of a small amount of fluid. The second valve body 13 is configured such that this valve body 13 can be maintained under its closed state with the leak flux of the solenoid 2 from the first valve body 12 and also that this valve body 13 can be switched over into its opened state in response to reduction in the power supply current to the solenoid 2. Hence, the first valve body 12 and the second valve body 13 are maintained under the respective closed states, by the magnetic flux of the common solenoid 2 and also the switchover of the second valve body 13 into its opened state is made possible only by reduction in the power supply current to the solenoid 2.

Figure 5:
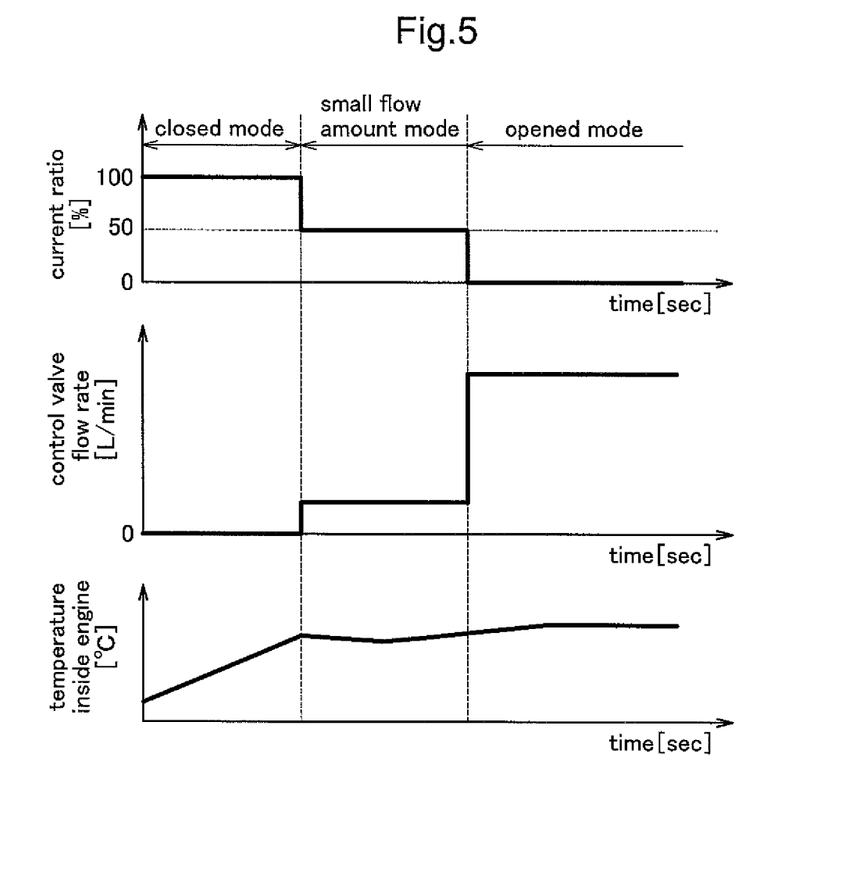
[FIG. 5] is a view showing relationship among an inside temperature of engine, a flow rate of the control valve, a current ratio and opened and closed states of the control valve.

In this way, when the coolant control valve 1 is switched to the opened state upon detection of the temperature inside the engine 21 having reached the predetermined temperature, at the beginning of this process, a small amount of cooling water can be caused to flow into the engine 21 by opening the second valve body 13. With this, as shown in FIG. 5, the temperature inside the engine 21 will drop gently, immediately after supply of the cooling water to the engine 21. As a result, it is possible to avoid sharp temperature drop of the temperature inside the engine 21, so that the combustion in the engine 21 can proceed in a stable manner.

Figure 4:
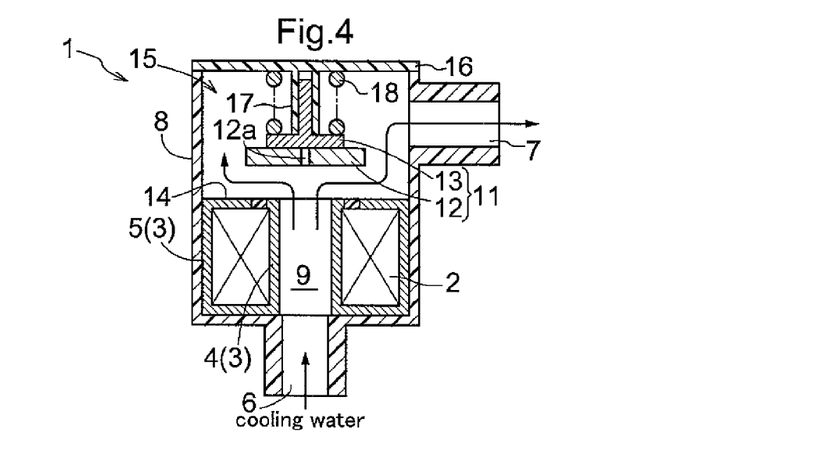
[FIG. 4] is a section view showing a condition where the first valve body of the vehicular coolant control valve is under an opened state.

After realization of the small flow amount mode with the second valve body 13 being under the opened state, when the temperature inside the engine 21 rises again to reach the predetermined temperature, the power supply to the solenoid 2 is released to open the first valve body 12. The fluid pressure affecting the first valve body 12 maintains this valve body 12 under the opened state against the urging force of the coil spring 18 (see FIG. 4).

After the cooling water is heated inside the engine 31, this water is cooled by the radiator 23 and then circulated via a thermostat valve 26 by the water pump 31. When the temperature of the engine 21 is low, the thermostat valve 26 is under a closed state. At the time of a heating operation, cooling water heated inside the engine 21 is fed via the coolant control valve 1 maintained by the fluid pressure under the opened state to the heater core 33, thereby to heat the vehicle cabin interior. The cooling water cooled by the heat core 33 is circulated via the thermostat valve 26 by the water pump 31.

The coolant control valve 1 is opened not by heat expansion of e.g. thermo wax or the like, but by the solenoid 2 which has a good response and can be freely controlled by an electric current. Therefore, the effect of heating can be provided speedily, thus achieving improvement in comfort during cold time. Further, under the closed state, the first valve body 12 and the valve seat 14 are in contact with each other to reduce the distance between the magnetic members, whereby the force of attraction per unit amount of current is increased and also the valve body 11 (first valve body 12, second valve body 13) is urged to the closed state by the urging force of the coil spring 18, whereby the power consumption of the solenoid 2 can be reduced. Moreover, as the second valve body 13 is constantly urged by the coil spring 18, vibration of the valve body 11 (first valve body 12, second valve body 13) due to fluid pressure pulsation can be restricted.

Furthermore, since the solenoid 2 is commonly used by the first valve body 12 and the second valve body 13 with the communication hole 12a formed in the first valve body 12 acting as a small flow amount fluid channel, the configuration of the coolant control valve 1 is made simple and the coolant control valve 1 per se can be formed compact.

[Second Embodiment]

Figure 6:
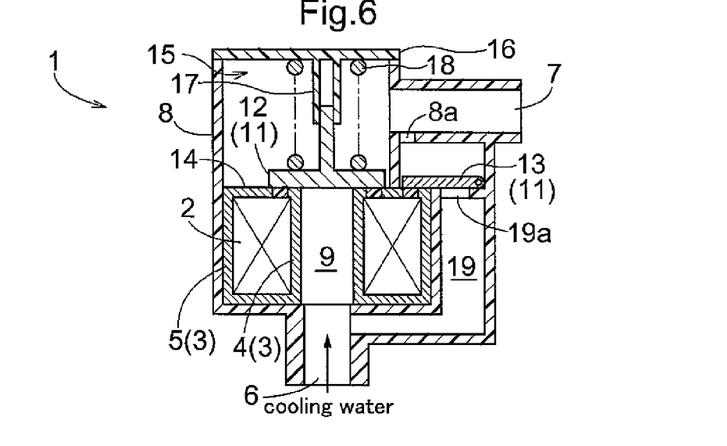
[FIG. 6] is a section view showing a condition where a first valve body and a second valve body of a vehicular coolant control valve according to a second embodiment are under closed states.
Figure 7:
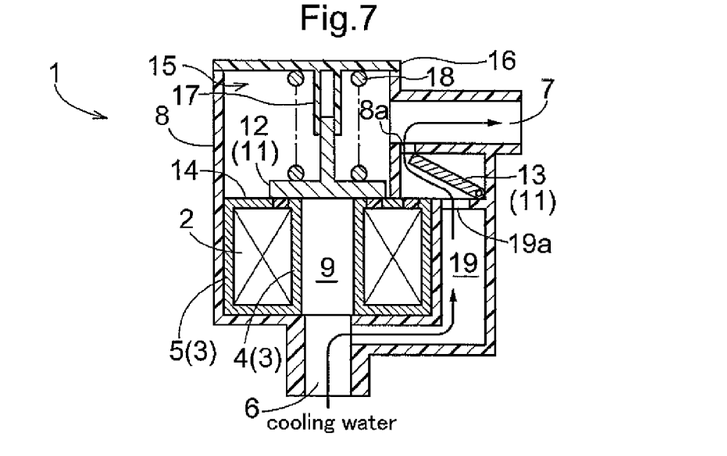
[FIG. 7] is a section view showing a condition where the first valve body of the vehicular coolant control valve according to the second embodiment is under a closed state and the second valve body of the same is under an opened state.
Figure 8:
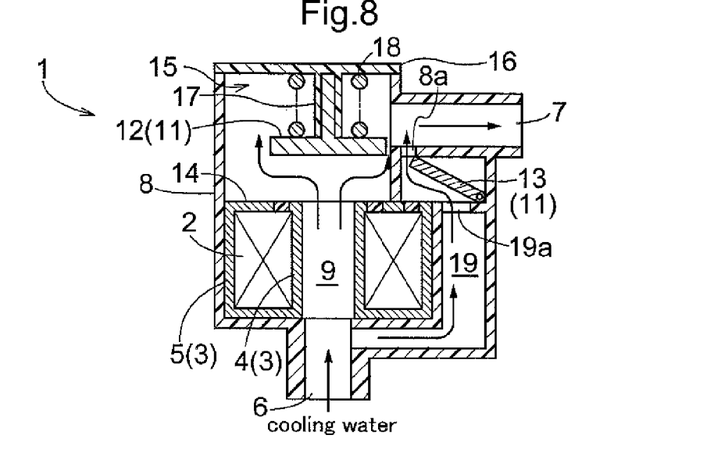
[FIG. 8] is a section view showing a condition where the first valve body and the second valve body of the vehicular coolant control valve according to the second embodiment are under opened states.

In this embodiment, as shown in FIGS. 6-8, the coolant control valve 1 is configured such that the first valve body 12 and the second valve body 13 are disposed side by side between the inlet port 6 and the outlet port 7, and the first intra-valve channel 9 extending through the first valve body 12 and the second intra-valve channel 19 bypassing the solenoid 2 and extending through the second valve body 13 are provided separately from each other. The second intra-valve channel 19 extending through the second valve body 13 is formed at a position from the inlet port 6 to the outer circumference of the solenoid 2 and forms a valve hole 19a. The second valve body 13 is urged to its closed state by an unillustrated coil spring or the like having one end pivotally supported. The housing 8 on the downstream side of the second valve body 13 forms a communication hole 8a communicated to the outlet port 7.

In the coolant control valve 1 illustrated in FIG. 6, the first valve body 12 and the second valve body 13 are under the closed states and at the time of start of pump operation, the solenoid 2 is excited with power supply thereto and a force of attraction acts on the first valve body 12 and the second valve body 13.

FIG. 7 shows the coolant control valve 1 under a small flow amount mode in which the second valve body 13 is under the opened state with the first valve body 12 being maintained under the closed state. Under this condition, the power supply current to the solenoid 2 is reduced, and the second valve body 13 is switched into the opened state as receiving a fluid pressure of the second intra-valve channel 19.

FIG. 8 shows the coolant control valve 1 under a normal opened mode in which both the first valve body 12 and the second valve body 13 are under the respective opened states and no electric power is supplied to the solenoid 2 so that the first valve body 12 too is switched into the opened state as receiving a fluid pressure of the first intra-valve channel 9.

[Third Embodiment]

With the mechanical type water pump 31, its discharge pressure of cooling water (coolant) increases in direct proportion to an engine rotational speed. For this reason, even when the power supply current to the solenoid is decreased in order to open the second valve body 13, in a high engine rotational speed range, there is possibility of the first valve body 12 being switched into the opened state as being affected by the influence of the rise of the discharge pressure. If this happens, the coolant control valve 1 will be unable to realize the small flow amount mode.

Figure 9:
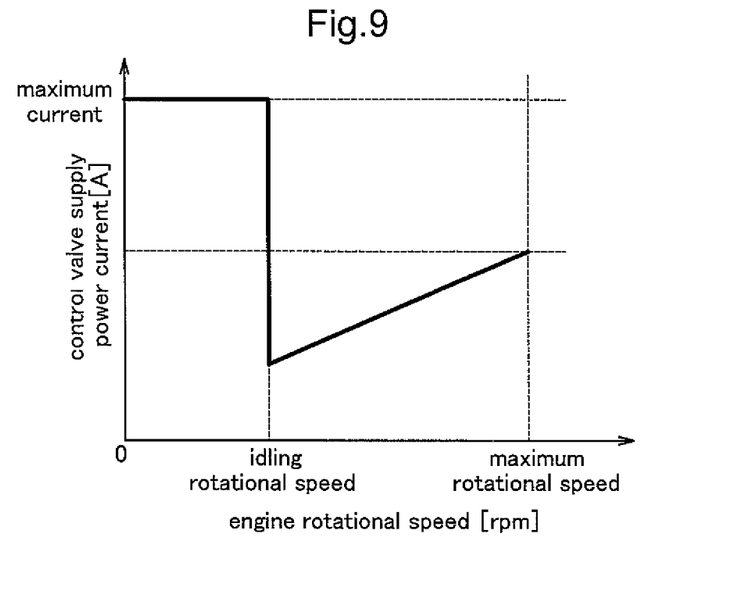
[FIG. 9] is a view showing relationship between engine rotational speeds and control valve supply power currents.

Then, in the instant embodiment, an arrangement is made such that the power supply current value to the solenoid 2 is set according to the engine rotational speed. More particularly, as illustrated in the graph shown in FIG. 9, the current value to be supplied for opening the second valve body 13 in accordance with rise in the engine rotational speed is set at a relatively high value. With this arrangement, in the high range of engine rotational speed too, the first valve body 12 will not be opened and the second valve body 13 alone will be opened to allow realization of the small flow amount mode.

[Fourth Embodiment]

When a defroster operation is requested by the driver during a vehicle traveling for instance, this may be said to be a highly urgent situation in which e.g. the windshield is frosted and urgency is required for ensuring visibility. In such situation, it is advantageous to allow a control operation responding to the highly urgent fluid supply be effected with priority over the small flow amount control of the fluid for restricting variation of cooling water temperature inside the engine 21.

In the instant embodiment, the valve body 11 is configured to be capable of being switched from the closed state to the opened state for opening first valve body 12, with keeping the second valve body 13 closed. As shown by the control flow in FIG. 10, if a request for small flow amount control is issued (#01), the process checks presence/absence of a defroster request (#02). If presence of a defroster request is confirmed, power supply to the solenoid 2 is turned OFF (#03), and the process checks whether the first valve body 12 has been rendered by receiving a fluid pressure into the opened state or not (#04).

Figure 10:
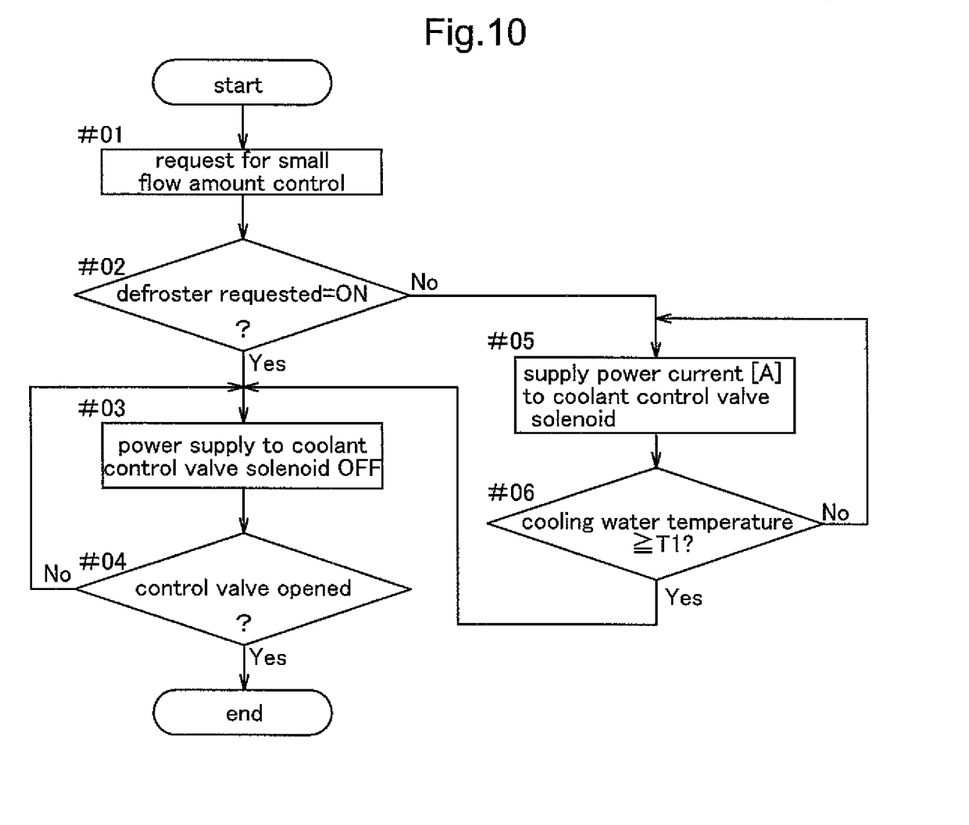
[FIG. 10] is a flowchart of an opening/closing control of the control valve.

If a request for small flow amount control is issued (#01), the process checks presence/absence of a defroster request (#02). Unless presence of a defroster request is confirmed, the power supply to the solenoid 2 is reduced (#05), whereby the small flow amount control is effected in which the second valve body 13 as receiving a fluid pressure is switched into the opened state. Then, the process checks whether the temperature of the cooling water inside the engine 21 is higher than a predetermined temperature T1 or not (#06); and when the temperature exceeds the predetermined temperature T1, the power supply to the solenoid 2 is turned OFF (#03).

In this way, if the valve body 11 is configured to be capable of being switched from the closed state to the opened state for opening first valve body 12, with keeping the second valve body 13 closed, it becomes possible to speedily supply fluid to the engine 21 as needed, thus improving the operability of the coolant control valve 1. Incidentally, the above-described urgent request by a driver is not limited to a defroster request.

[Other Embodiments]

(1) In the foregoing embodiment, there was shown an example wherein the coolant control valve 1 is applied as a coolant control valve for opening/closing a flow channel to the heater core 33. Instead, the coolant control valve 1 may be applied to the thermostat valve 26 for opening/closing the flow channel to the radiator 23.

(2) In general, the electromagnetic force of a solenoid is in direct proportion with a product of a current flowing in the coil and the number of turns of the coil (ampere-turn). Therefore, by changing either the current flowing in the coil and the number of turns of the coil, the electromagnetic force of a solenoid can be controlled. In the foregoing embodiment, as an arrangement for controlling the electromagnetic force of the solenoid, either one of the arrangement of controlling via the current flowing in the coil and the arrangement of controlling via the effective number of turns of the coil can be employed. Here, the language "effective number of turns of the coil" refers to the number of coils to which the power is actually supplied, of the total number of coils included in the solenoid.

Figure 12:
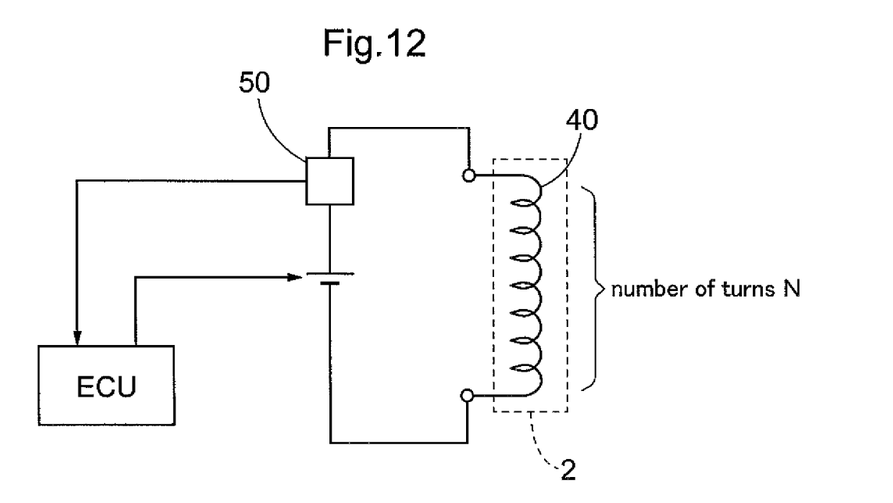
[FIG. 12] is a view showing a circuit for controlling an electromagnetic force of a solenoid by varying a current value.

In the case of controlling the electromagnetic force of the solenoid 2 via the current flowing through the coil 40, for instance, as shown in FIG. 12, a current sensor 50 and an ECU will be disposed in a power circuit, so that the current is varied by the ECU based on a value of the current sensor 50, thus effecting the control.

Figure 13:
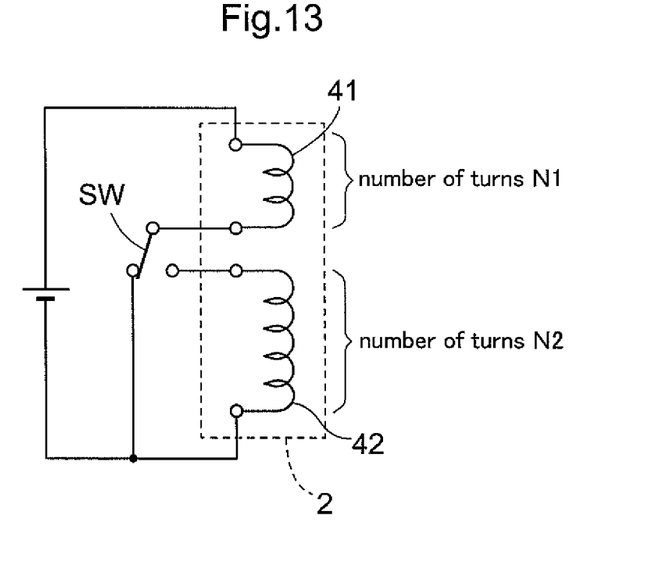
[FIG. 13] is a view showing a circuit for controlling an electromagnetic force of a solenoid by varying an effective number of turns of a coil.

In the case of controlling the electromagnetic force of the solenoid 2 via the effective number of turns of the coil, the solenoid will be configured to include at least one coil and a number-of-turns varying section capable of varying the effective number of turns of the coil. For instance, as shown in FIG. 13, as coil wires of the solenoid 2, there are provided a coil 41 (number of turns: N1) and a coil 42 (number of turns: N2). And, a selector switch SW (setting section) is provided for varying the effective number of turns of the coil supplied with power, between the number of turns N1 of the coil 41 and and the number of turns of the coil 41 and the coil 42 (N1+N2). With this arrangement, with switchover by the selector switch SW (number-of-turns varying section), the effective number of turns of the coil is varied, so that the magnitude of the electromagnetic force to be applied to the valve body 11 (first valve body 12, second valve body 13) can be switched over. As a result, the current sensor 50 becomes unnecessary, and the arrangement for controlling the electromagnetic force of the solenoid 2 is made simple. Consequently, the costs of the coolant control valve 1 can be further reduced.

As the configuration of the number-of-turns varying section in the solenoid 2, this may be a configuration of varying the effective number of turns of the coil by moving the position of contact to one coil. Or, three or more contacts can be provided in the selector switch SW for a plurality of coils. Or, the number of coils of the solenoid can be three or more. Further alternatively, a plurality (e.g. six) of coils that can attract the valve body 11 in a stable manner can be disposed in distribution along the circumferential direction of the solenoid 2, so that the effective number of turns can be varied by supply power to all the coils or to a portion or some (e.g. three disposed with equal spacing) of them.

(3) In the foregoing embodiment, there was shown an example of the solenoid 2 of the coolant control valve 1 wherein when this solenoid is excited at the time of start of the engine 21, the solenoid 2 provides a weak force just enough to maintain the contact with the first valve body 12 (second valve body 13). Instead, it is also possible to employ a strong solenoid capable of moving the first valve body 12 into contact with the valve seat 14 against the fluid pressure, when the solenoid 2 is supplied with power again after switching of the first valve body 12 to the opened state (the state wherein the first valve body 12 and the valve seat 14 are apart from each other).

(4) In the foregoing embodiment, the solenoid 2 of the coolant control valve 1 is disposed along the circumference of the intra-valve channel 9. Instead, due to such reason as mounting, the solenoid 2 may be disposed at a position away from the coolant channel. In the second embodiment described above, there was shown an example wherein the solenoid 2 is commonly used by the first valve body 12 and the second valve body 13. Instead of this, a solenoid for attracting and retaining the second valve body 13 may be provided separately from the solenoid 2 of the first valve body 12. Further, the coil spring 18 is employed as the urging mechanism of the valve body 11. Instead, the valve body 11 may be urged toward its closing direction by such a moving means as a pneumatic spring, magnetism, the gravity acting on the mass of the valve body 11, etc. The means for circulating cooling water is not limited to the water pump 31. In addition, a pressure accumulator or the like may be employed auxiliarily.

(5) In the foregoing embodiment, the coolant control valve 1 is employed in the cooling system of the engine 21 body. Instead, this valve 1 may be used in a catalysis cooling system or liquid-cooled oil cooler installed in an exhaust pipe. Further alternatively, the valve 1 may be used as a coolant control valve in a cooling system or an exhaust heat collecting system of a heat source such as a motor, an inverter, a secondary cell, a fuel cell for use in an electric powered vehicle.

Industrial Applicability

The vehicular coolant control valve relating to the present invention may be used for a variety of cooling targets in various kinds of vehicle.

The invention claimed is:

1. A vehicular coolant control valve comprising:
   a valve body having a magnetic body and controlling flow of fluid;
   a valve seat constituting a flow channel for the fluid and coming into contact with the valve body to close the flow channel;
   a solenoid configured to magnetically maintain a contact state between the valve body and the valve seat;
   an urging mechanism urging the valve body in a direction opposite to a flow direction of the fluid;
   wherein the valve body includes a first valve body maintaining a contact state with the valve seat when the solenoid is excited and a second valve body configured to allow passage of a small amount of the fluid when the first valve body is in contact with the valve seat; and
   wherein the urging mechanism is configured to urge the first valve body in its closing direction via the second valve body.

2. The vehicular coolant control valve according to claim 1, wherein the first valve body forms a communication hole for the fluid, and the second valve body is configured to be switched over between a closed state closing the communication hole and an opened state opening the communication hole and the second valve body is maintained under the closed state with leakage flux of the solenoid from the first valve body and is configured to be switched over to the opened state in response to decrease in power supplied to the solenoid.

3. The vehicular coolant control valve according to claim 2, wherein the second valve body is switched into the opened state by a fluid pressure of the fluid passing through the communication hole, in response to decrease in the power supplied to the solenoid.

4. The vehicular coolant control valve according to claim 1, wherein the valve body is configured to be switched to an opened state for opening the first valve body from a closed state, while keeping the second valve body closed.

5. The vehicular coolant control valve according to claim 1, wherein the solenoid includes at least one coil and a number-of-turns varying section for effecting control of the solenoid by varying an effective number of turns of the coil.

6. The vehicular coolant control valve according to claim 1, wherein:
   the first valve body and the second valve body are disposed side by side between an inlet port and an outlet port;
   the control valve includes a first intra-valve channel incorporating the first valve body and a second intra-valve channel incorporating the second valve body and bypassing the solenoid;
   the second valve body is configured to switch a valve hole formed in the second intra-valve channel between a closed state and an opened state;
   the first valve body and the second valve body are maintained under a respective closed state in response to excitation of the solenoid with power supply thereto; and
   the second valve body is configured to be switched into the opened state by a fluid pressure inside the second intra-valve channel in response to decrease in the power supplied to the solenoid.

* * * * *